United States Patent
Hirose et al.

(10) Patent No.: US 6,753,972 B1
(45) Date of Patent: Jun. 22, 2004

(54) THIN FILM THICKNESS MEASURING METHOD AND APPARATUS, AND METHOD AND APPARATUS FOR MANUFACTURING A THIN FILM DEVICE USING THE SAME

(75) Inventors: Takenori Hirose, Yokohama (JP); Minori Noguchi, Yokohama (JP); Yukio Kenbo, Yokohama (JP); Shunji Maeda, Yokohama (JP); Takanori Ninomiya, Hitachinaka (JP); Hirofumi Tsuchiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,570

(22) PCT Filed: Apr. 19, 1999

(86) PCT No.: PCT/JP99/02073

§ 371 (c)(1),
(2), (4) Date: Aug. 18, 2000

(87) PCT Pub. No.: WO99/54924

PCT Pub. Date: Oct. 28, 1999

(30) Foreign Application Priority Data

Apr. 21, 1998 (JP) .......................................... 10-110384
Oct. 21, 1998 (JP) .......................................... 10-299311

(51) Int. Cl.[7] .......................... G01B 11/28; G01B 11/06; G01B 11/02

(52) U.S. Cl. ....................... 356/630; 356/632; 356/503; 356/504

(58) Field of Search ............................... 356/503, 504, 356/630, 632

(56) References Cited

U.S. PATENT DOCUMENTS

| | | | |
|---|---|---|---|
| 3,612,692 A | * 10/1971 | Kruppa et al. | 356/492 |
| 4,293,224 A | * 10/1981 | Gaston et al. | 356/504 |
| 4,606,641 A | * 8/1986 | Yamada et al. | 356/369 |
| 4,660,980 A | * 4/1987 | Takabayashi et al. | 356/504 |
| 4,666,305 A | * 5/1987 | Mochida et al. | 356/632 |
| 4,748,329 A | * 5/1988 | Cielo et al. | 250/559.28 |
| 4,984,894 A | * 1/1991 | Kondo | 250/372 |
| 4,999,014 A | * 3/1991 | Gold et al. | 356/632 |
| 4,999,508 A | * 3/1991 | Hyakumura | 250/559.27 |
| 5,440,141 A | * 8/1995 | Horie | 250/559.27 |
| 5,452,091 A | * 9/1995 | Johnson | 356/445 |

(List continued on next page.)

OTHER PUBLICATIONS

Tang, Wallace; Method And Apparatus For Monitoring Thin Films; International Publication Date: Jul. 6, 1995; International Application Published Under The Patent Cooperation Treaty (PCT); International Publication No.: WO 95/18353.*

*Primary Examiner*—Loha Ben
*Assistant Examiner*—Jack Dinh
(74) *Attorney, Agent, or Firm*—Antonelli, Terry, Stout & Kraus, LLP

(57) ABSTRACT

This invention aims to measure film thickness and film thickness distribution to high precision in a wide range of transparent films. As one example, in a CMP process, the film thickness of an outermost surface layer formed on a step pattern of an actual product can be measured so that high precision film thickness control can be performed. To achieve an increase of processing throughput, the film thickness of an optically transparent film formed on an actual device pattern is controlled to high precision by incorporating a film thickness measuring unit, which performs frequency analysis of a spectral distribution, in a polishing apparatus. As a result, an increase of processing throughput is realized. To perform the high precision measurement, the frequency analysis is performed on the spectral distribution waveform of interference light from white light due to the film, and an absolute value of film thickness is computed from the relation of the phase of frequency components in the waveform and film thickness.

22 Claims, 10 Drawing Sheets

U.S. PATENT DOCUMENTS

| | | | | |
|---|---|---|---|---|
| 5,555,471 A | * | 9/1996 | Xu et al. | 356/504 |
| 5,587,792 A | * | 12/1996 | Nishizawa et al. | 356/497 |
| 5,610,716 A | * | 3/1997 | Sorin et al. | 356/479 |
| 5,856,871 A | * | 1/1999 | Cabib et al. | 356/503 |
| 6,137,575 A | * | 10/2000 | Sugiyama et al. | 356/503 |
| 6,142,855 A | * | 11/2000 | Nyui et al. | 451/67 |
| 6,348,967 B1 | * | 2/2002 | Nelson et al. | 356/432 |

* cited by examiner (a) EXAMPLE WHERE FILM THICKNESS MEASUREMENT IS POSSIBLE (b) EXAMPLE WHERE FILM THICKNESS MEASUREMENT IS DIFFICULT

THIN FILM THICKNESS MEASURING METHOD AND APPARATUS, AND METHOD AND APPARATUS FOR MANUFACTURING A THIN FILM DEVICE USING THE SAME

BACKGROUND OF THE INVENTION

This invention relates to the measurement of thickness and thickness distribution of a transparent film and film thickness control.

More particularly, this invention relates to a method/apparatus for measuring the film thickness of an outermost surface, to a flattening apparatus and to a process control method for wafers in film-forming steps or wafers in surface flattening processes after film-forming steps. For example in methods or production lines for manufacturing semiconductor devices on silicon wafers.

Other examples of transparent films in addition to those mentioned above are resist films or insulating films in steps for manufacturing thin film devices such as DVD, TFT and LSI reticules.

Semiconductor devices may for example be manufactured by forming a device and an interconnection pattern on a silicon wafer through the processes of film-forming, light exposure and etching. In recent years, in order to achieve higher precision and higher densities, interconnection patterns formed on silicon wafers are tending towards greater fineness and multiple layers. The forming of multiple layers of fine patterns is leading to increasing numbers of imperfections on wafer surfaces. If there are large numbers of imperfections on wafer surfaces, when fine interconnection patterns on wafers are exposed to light, it is difficult to expose the fine patterns with good dimensional and contour precision. One method used to resolve this problem consists of flattening a wafer surface on which a protecting film or insulating film is formed on a multilayer interconnection layer.

The flattening process uses CMP (Chemical Mechanical Polishing), which flattens the surface by polishing it by a chemical and physical action. CMP is a well-known process in this technical field.

An important topic in the CMP process is that of film thickness control. In the prior art, this was controlled by the process time. After the CMP process, when measurements were actually made with an ordinary film thickness measuring apparatus, a pattern (dummy pattern) of sufficient size to be easily measured by the film thickness measuring apparatus, and which was for example formed on the periphery of the chip, was measured. Further, the measurement of film thickness was performed after completing the process, washing and drying.

Japanese Unexamined Patent Publication Hei 6-252113 and Japanese Unexamined Patent Publication Hei 9-7985 disclose an in-situ measuring system capable of measuring film thickness on an actual device pattern (a fine circuit pattern on an actual product). In Japanese Unexamined Patent Publication Hei 6-252113, in the measurement of film thickness on an actual device pattern, the spectral distribution of interference light from white light due to the film is frequency-analyzed, the relation between frequency components having this spectral distribution waveform and film thickness is examined, and an absolute value of film thickness is thereby computed. On the other hand, in Japanese Unexamined Patent Publication Hei 9-7985, the change with processing time of the interference light intensity from a laser (single wavelength) is detected, and the film thickness is computed from frequency components having this waveform.

In general, in film thickness control by process time of CMP, as the polishing amount (polishing rate) per unit time varies, and due to the fact that the polishing rate is different according to the proportion of a pattern formed on a wafer in one plane (referred to hereafter as pattern surface area factor), it was difficult to perform precise film thickness control. When measurements were performed, the outermost surface film thickness was almost always different as the pattern surface area factor on the dummy pattern was different from that on an actual device pattern. If film thickness was measured after washing and drying, some time was required and this led to a decrease of throughput (FIG. 2). In laminated patterns, interconnection pattern thickness and inter-pattern volume, for example, could not be precisely controlled on the dummy pattern. Further, when examining for defects in an actual device pattern, it was difficult to perform an examination in the film thickness direction.

In the method described in Japanese Unexamined Patent Publication Hei 6-252113, although it depends on the detection wavelength region of the white light, the measurement precision on an actual device pattern is ±50 nm and the film thickness cannot be computed with high precision. On the other hand, in the method described in Japanese Unexamined Patent Publication Hei 9-7985, the absolute value of film thickness cannot be found with one measurement.

It is therefore an object of this invention to provide a method and apparatus which can measure film thickness and film thickness distribution of a transparent film to a precision of at least ±20 nm, and preferably at least ±10 nm, in an actual device pattern for example, and to provide a method and apparatus for manufacturing a thin film device using this technique.

As an example of this, it is an object of this invention to provide a measurement method and apparatus which, instead of performing measurements on a dummy wafer which has a different polishing rate from an actual device pattern, or on a dummy pattern formed on a product wafer of sufficient size to be measured by a prior art film thickness measuring apparatus, are able to measure absolute values of film thickness on the outermost surface layer of an actual product device pattern to a high precision, to provide a method and apparatus which allow high precision film thickness control by measuring the film thickness on the outermost surface layer of an actual device pattern to high precision, and a method and apparatus which achieve improved process throughput.

SUMMARY OF THE INVENTION

To achieve the above objects, according to this invention, as a technique for measuring film thickness on an actual device pattern, a frequency/phase analysis is performed on a spectral distribution waveform of interference light from light due to a film, and an absolute value of film thickness is computed from a relation between frequency and phase components having a certain waveform and film thickness, or by fitting to a waveform derived from a structural model of the film or a simulation. By calculating a film thickness distribution on an actual device pattern using this measurement technique, high precision film thickness control and process stabilization are achieved. Further, by incorporating a film thickness measurement unit comprising this measurement technique in a polishing apparatus, an improvement of throughput is obtained. The effect of this invention is enhanced by using white light as the light which irradiates the film.

According to this invention, to achieve the above objects, a sample on which an optically transparent thin film is formed on a step pattern is irradiated by light, a reflected light produced by the sample due to this light irradiation is detected, and the film thickness of the optically transparent film formed on the step pattern is calculated based on the spectral distribution waveform of the detected reflected light.

In this way, according to this invention, if the light which irradiates the sample is white light, the film thickness of the optically transparent film can be calculated to a precision of at least ±20 nm.

(a) shows a case where a detecting optical unit according to this invention is provided in a polishing board.

(b) shows a case where measurement is performed by the detecting optical unit according to this invention by interrupting the polishing process.

(c) shows a case where measurement is performed by the detecting optical unit according to this invention without performing washing and drying after completing the polishing process.

Figure 6:
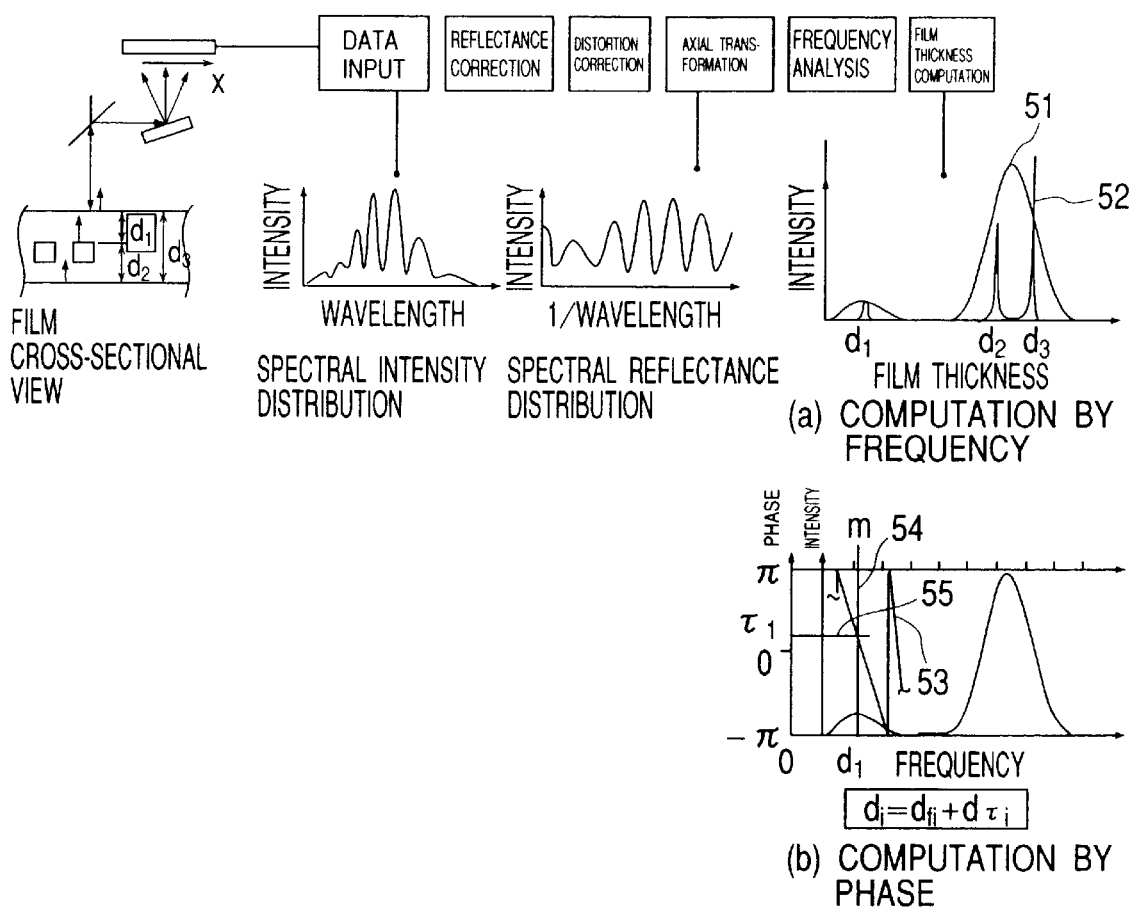

FIG. 6 is a flowchart showing an outline of the processing flow from acquisition of data to computation of film thickness according to this invention.

Figure 3:
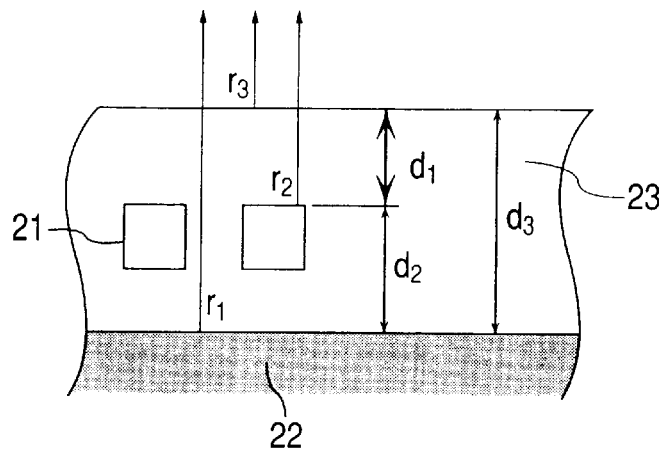
FIG. 3 is a diagram showing a simple film cross-section when a single layer pattern is present in one of the samples which can be measured by this invention.
Figure 7:
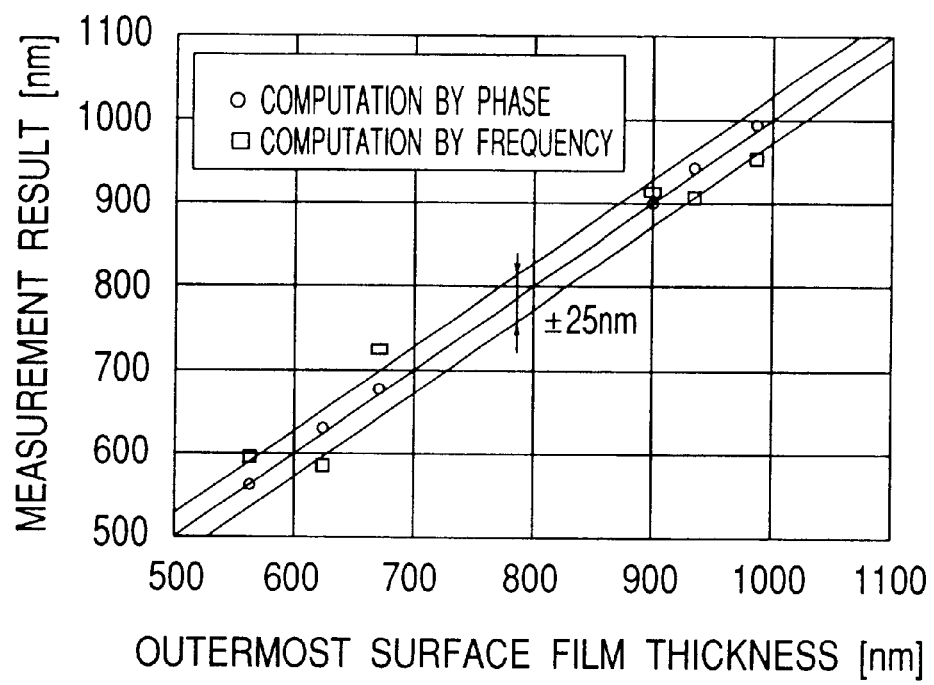

FIG. 7 is an example showing computation results when frequency and phase are used for computation of film thickness on a sample having the structure shown in FIG. 3.

Figure 5:
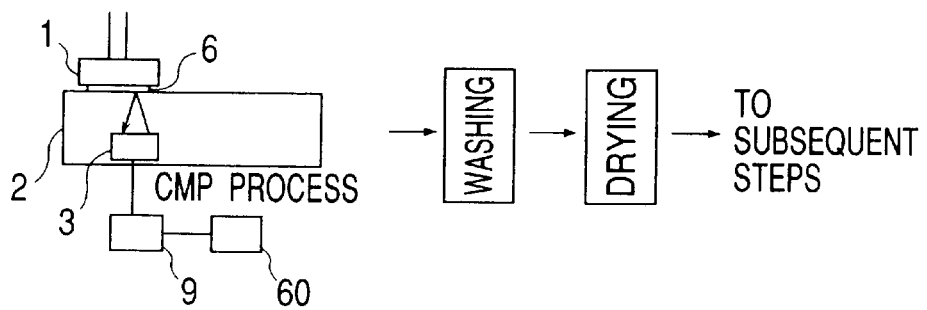
FIG. 5 is a schematic view showing embodiments when this invention is applied to a sequence of steps from a CMP process to washing and drying, corresponding to the following cases.
Figure 5:
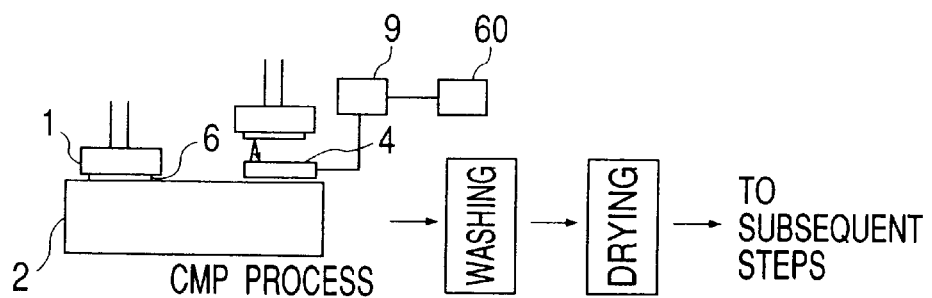
Figure 5:
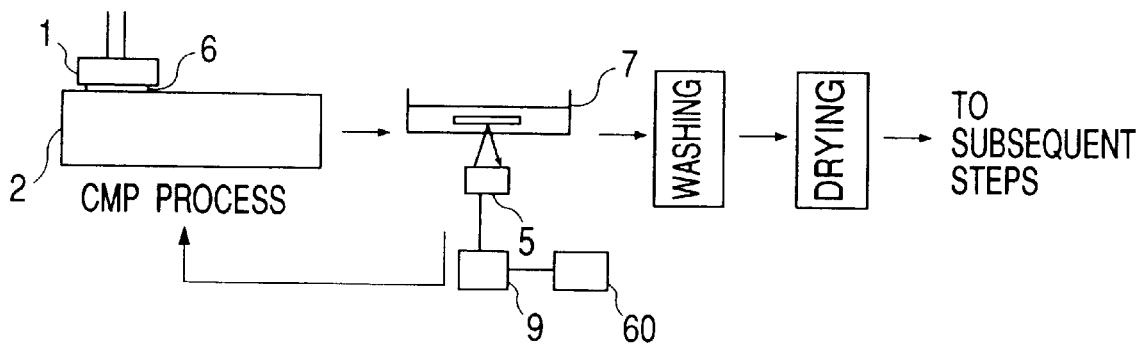
Figure 8:
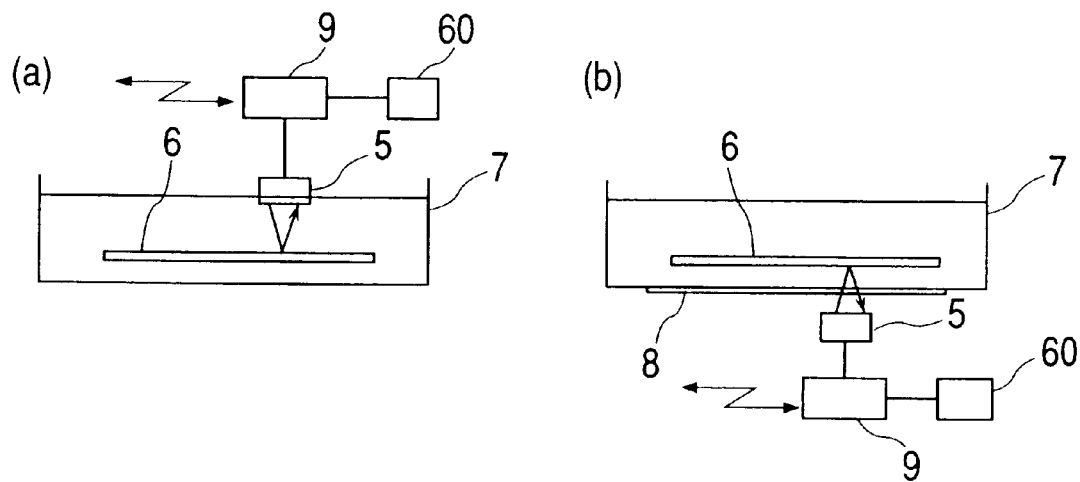

FIG. 8 is a schematic view showing one embodiment when film thickness is measured in water in a water tank 7 shown in FIG. 5(C).

(a) shows the case where measurement is performed by immersing a detector in water, (b) shows the case where measurement is performed via an optical window.

Figure 9:
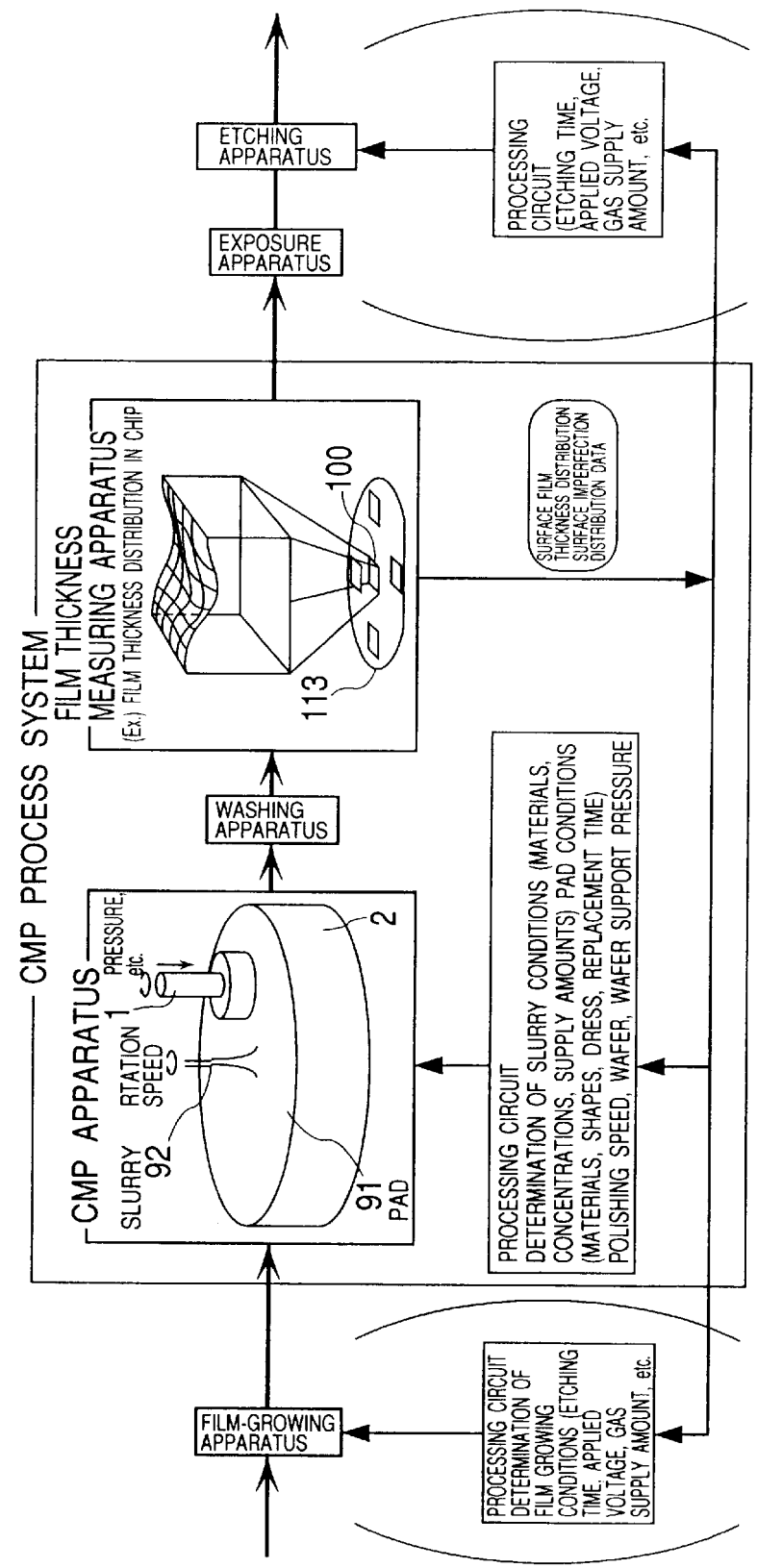

FIG. 9 is a process flowchart showing typical steps where film thickness measurement results are fed back to process conditions.

Figure 10:
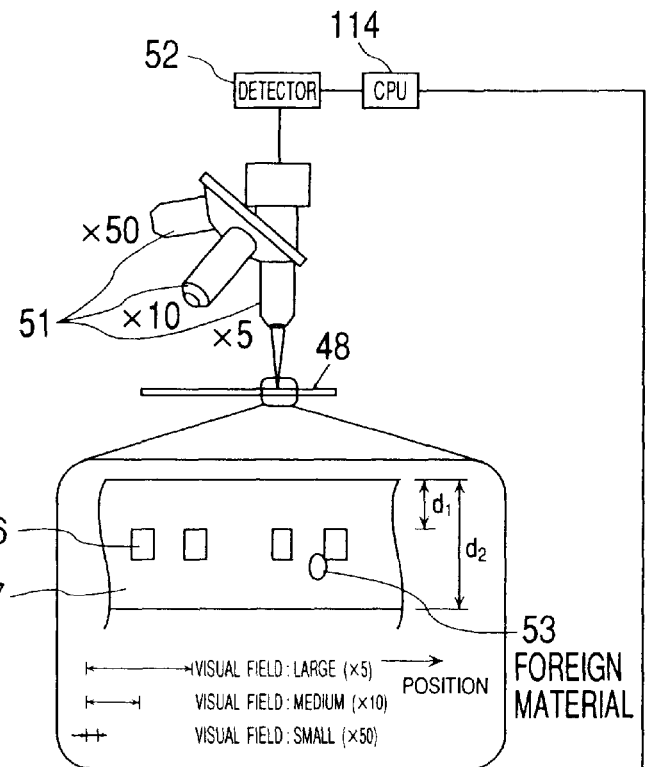
Figure 10:
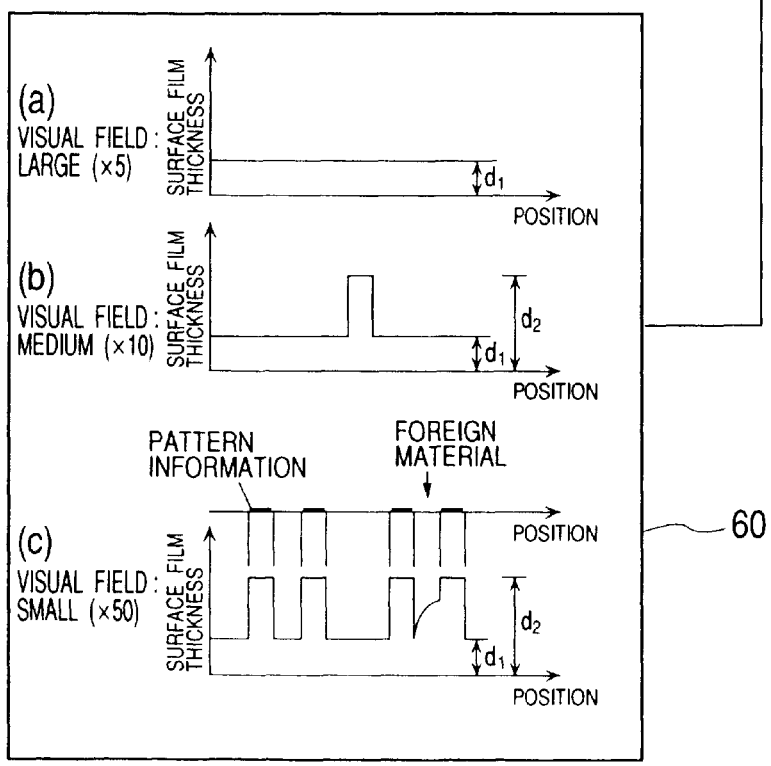

FIG. 10 is a schematic view showing an example of a method where the size of the measurement visual field can be changed over, and an example showing that measurement results are different depending on the size of the measurement visual field.

Figure 11:
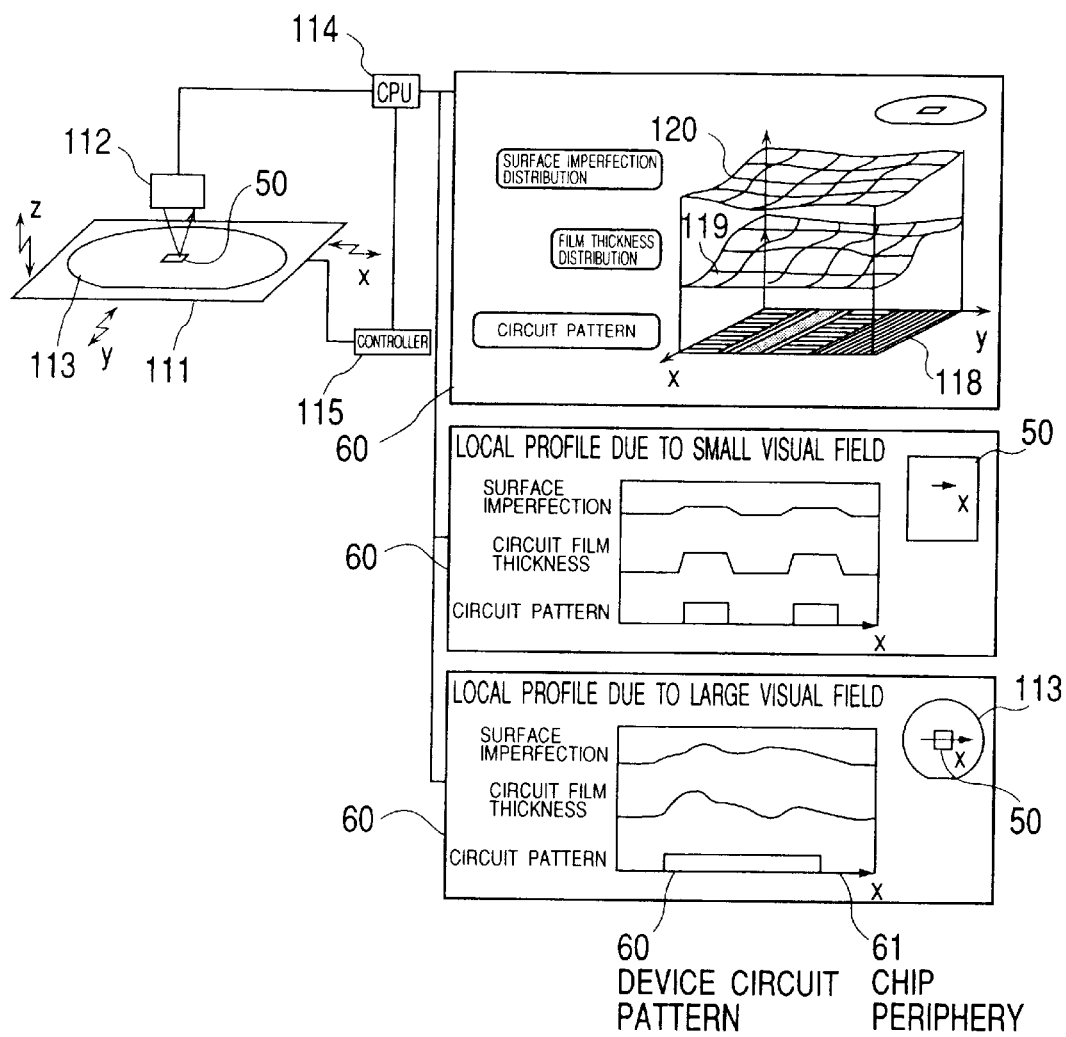

FIG. 11 shows an example of a schematic construction and result display when a film thickness distribution and surface imperfections on wafer surface parts are simultaneously measured by this invention.

Figure 12:
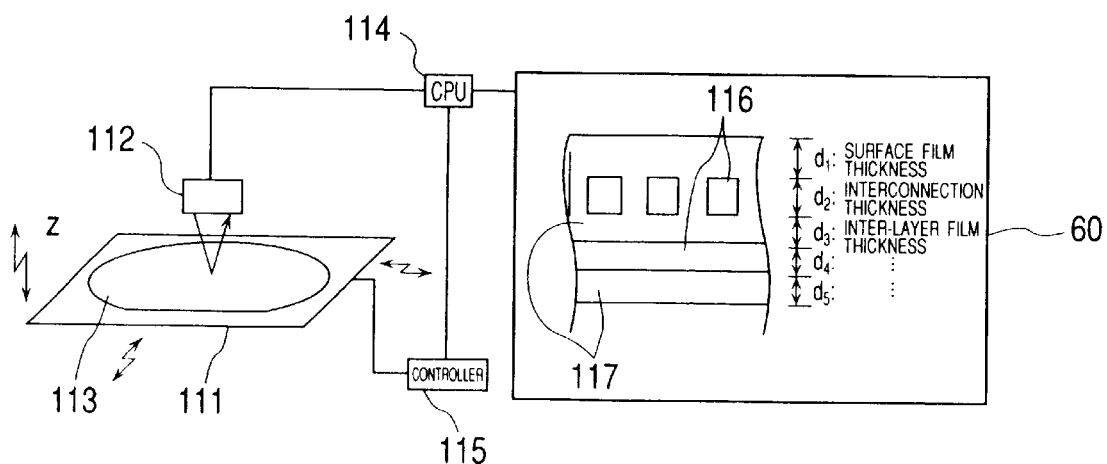

FIG. 12 shows an example of a schematic construction and result display when the thicknesses of a multilayer structure are measured by this invention.

Figure 13:
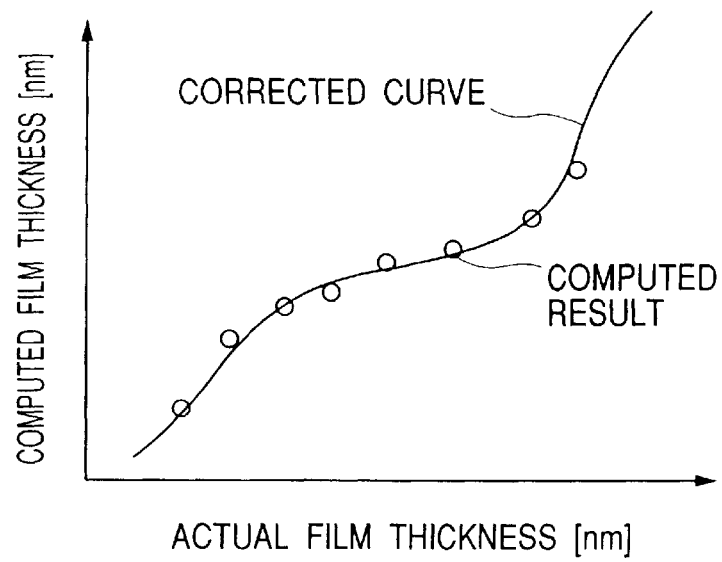

FIG. 13 shows an example of a correction curve used to reduce computational error when the film thickness of a sample comprising a film of plural layers is computed using frequency analysis.

Figure 14:
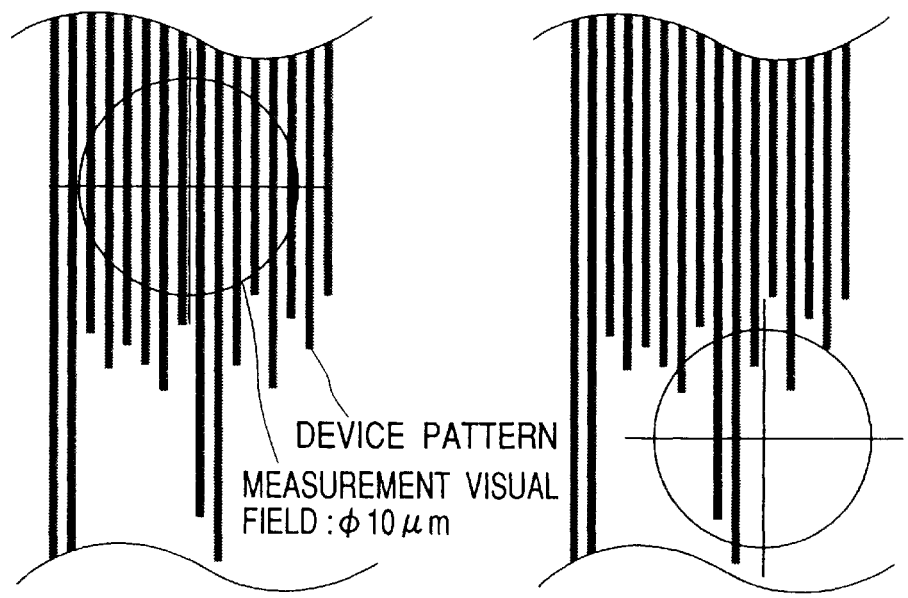

FIG. 14 shows a typical pattern of a sample in a measurement visual field.

(a) shows an example when film thickness measurement is possible, (b) shows an example when film thickness measurement is difficult.

Figure 15:
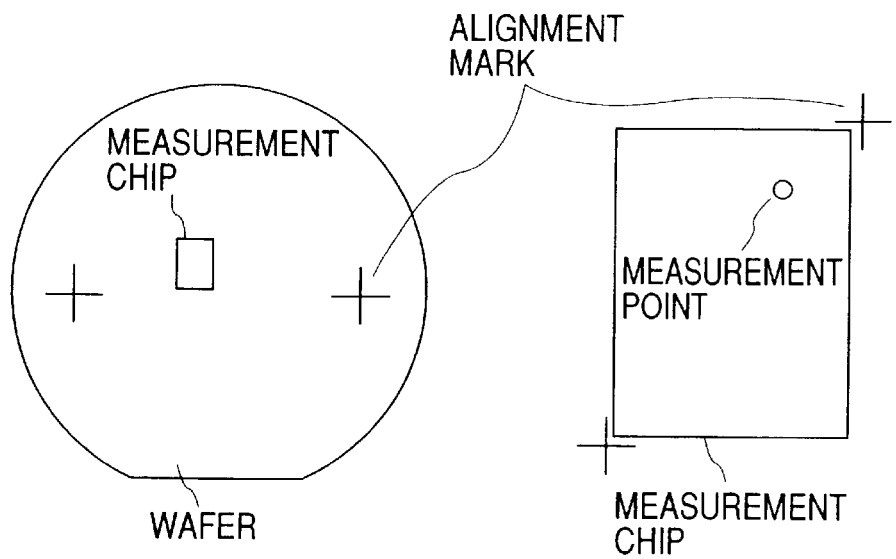

FIG. 15 is a diagram showing an example of a measuring position determining method during a film thickness measurement according to this invention, wherein alignment is performed using an alignment mark formed on a wafer.

Figure 16:
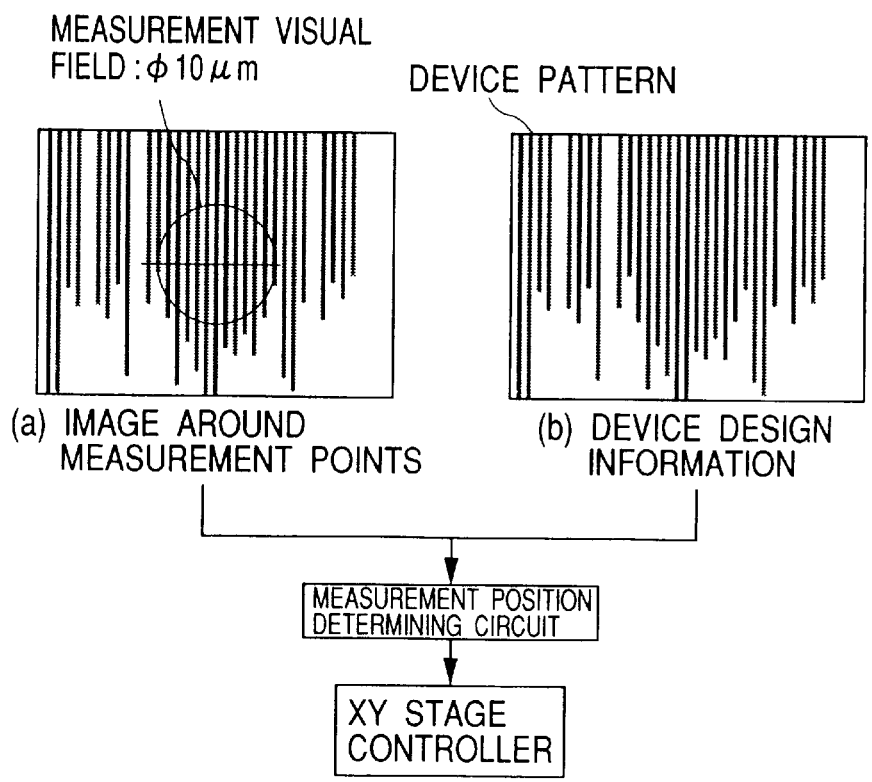

FIG. 16 is a schematic view showing an example of a measuring position determining method during a film thickness measurement according to this invention, wherein design information is used.

DESCRIPTION OF THE PREFERRED EMBODIMENTS

As a typical embodiment of this invention, an example will be described where the invention is applied to the measurement of outermost surface film thickness of a wafer after or during a CMP process in the manufacture of a semiconductor device.

Figure 1:
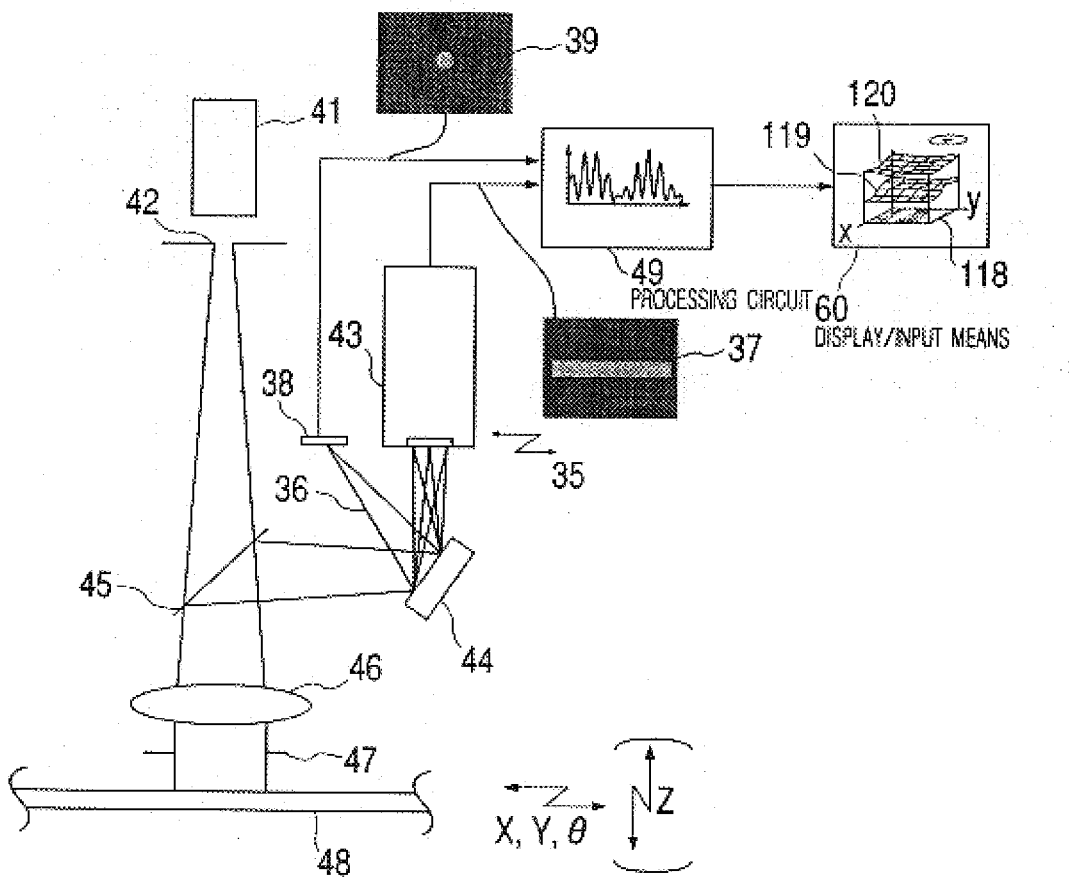
FIG. 1 is a schematic cross-sectional view showing the construction of a detecting optical unit according to this invention.
Figure 2:
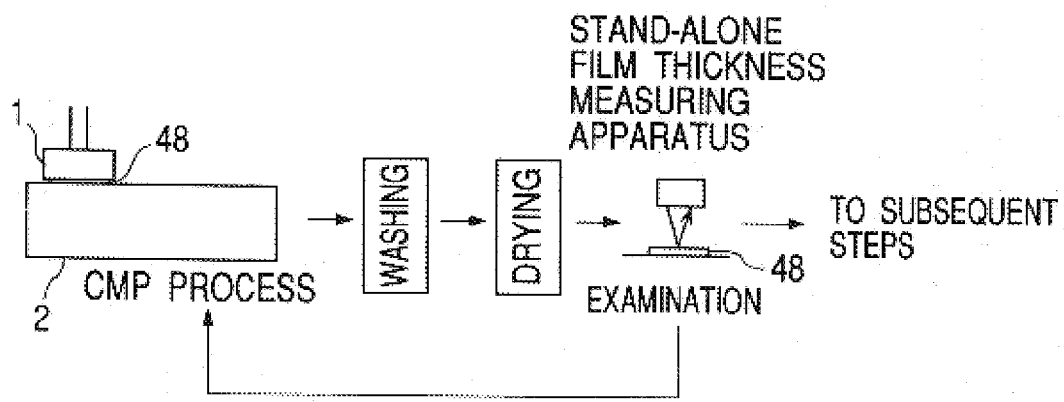
FIG. 2 is a schematic view showing a prior art film thickness measurement/control system.

FIG. 1 shows an example of a detecting optical system to achieve the object of this invention. The system comprises a white light source (halogen lamp) 41, pinhole 42, beam splitter 45, lens 46, iris diaphragm 47, diffraction grating 44, detector (CCD camera) 43, and processing circuit 49 for acquiring data from the detector and computing film thickness from the acquired data.

White light emitted by the light source 41 passes through the pinhole 42 and beam splitter 45, is rendered parallel by the lens 46, and passes through the iris diaphragm 47 to impinge on a film to be measured, not shown, on the surface of a wafer 48. The light reflected by the wafer 48 passes through the iris diaphragm 47 and the lens 46, and its path is changed by the beam splitter 45 so that it impinges on the diffraction grating 44. The light which is split into spectral components by the diffraction grating 44 forms an image on the detector 43, and a spectral intensity distribution 37 can then be calculated. The reflected light contains interference due to the film being measured, and it has a spectral intensity distribution corresponding to the structure in the film. The film thickness is then computed by the processing circuit 49 which performs correction and frequency analysis on this spectral intensity distribution.

An absolute position sensor 38 is provided which detects the position of zero order light (regularly reflected light) 36, the position of the zero order light (image of the pinhole 42) being found by a center of gravity calculation, for example, by the processing circuit 49. Instead of providing the absolute position sensor 38, the detector 43 may be displaced in the direction shown by an arrow 35 in the figure (stage is not shown) to perform the detection. An image can also be simultaneously formed on the detector 43 to perform the detection using a mirror or the like.

In addition to a halogen lamp, the white light source may be a light source having a wide wavelength range such as a xenon lamp, or laser light having plural different wavelengths may also be used.

In addition to a CCD two-dimensional sensor, a one-dimensional line sensor can also be used for the detector, but if a two-dimensional sensor is used, the adjustment of the alignment direction of the line sensor with the diffracted light can be omitted. A sensor other than a CCD may also be used.

FIG. 6 shows the process flow from acquisition of data to film thickness computation.

The data which can be acquired by the CCD camera is a spectral intensity distribution (referred to also simply as a spectral distribution). To calculate the spectral intensity distribution from the acquired two-dimensional image (37 in FIG. 1), the maximum value of each coordinate is taken in one axial direction of the image (data input, FIG. 6). When one axis of the two-dimensional sensor and the diffracted light distribution form a constant angle, the error due to this angle is corrected by calculation from the angle. In other words, it must be possible to convert the two dimensional spectral distribution image to a one-dimensional waveform. Also, there is a method wherein plural lines are processed at one time in the spectral distribution direction of the two-dimensional sensor, and the difference due to a position on a screen is reduced.

Due to these methods, various corrections can be applied to the two-dimensional image. There is also a method to further increase precision by adding a correction of the optical system as described hereafter. Further, the waveform range acquired by the sensor may be determined from the zero order light position and the spectral characteristics of the diffraction grating.

The spectral intensity distribution obtained is affected by the spectral intensity distribution of the light source and by the optical system. The spectral intensity distribution data of the light source or correction data using a material for which the reflectance characteristics are known can be measured in advance, and a spectral reflectance distribution calculated by applying a correction such as dividing the measured data by this data (reflectance correction, FIG. 6). In this way, the effect of the spectral distribution of the light source and of the optical system can be considerably reduced.

The interference light is split into spectral components by the diffraction grating and forms an image on the detector, but if the detector is flat like a CCD, as the light is diffracted, the wavelengths of the light incident on the CCD do not have regular intervals on the CCD. Hence, a correction is applied so that the wavelengths do have regular intervals when the spectral distribution is calculated (distortion correction, FIG. 6). This correction may be made by calculation from the positional relationship between the detector (CCD) and the diffraction grating.

Instead of performing a correction by calculation, a diffraction grating or a detector having a curvature which cancels this distortion may be used. To impart this curvature, a curvature may be given by a mold or the like during packaging in the manufacture of the detector to the extent that the electrical characteristics do not vary. If the curvature is small, it may also be given by a clamp or the like in the manufacturing stage. In other words, the characteristics must not change. This is also performed to correct for distortion in the image-forming plane of the optical system and improve detection precision, or it may have the effect of permitting some distortion of the optical system to make it more economical. Further, detector elements may be aligned with the curvature to improve the detection precision of colour separation.

To perform the frequency analysis, the horizontal axis is transformed from a wavelength ($\lambda$) to an inverse wavelength ($1/\lambda$) (axial transformation, FIG. 6). For this transformation, it is necessary to know the wavelength of the light forming an image at each point on the detector. This may be found by calculation by finding the positional relationship between the detector and the diffraction grating. Alternatively, laser light (monochromatic light) may be used instead of white light for the light source, and the wavelength found to a higher precision from the image-forming position on the detector, and the positional relationship between the diffraction grating and the detector. By using plural wavelengths for the laser light, the correction precision is improved.

As a means of obtaining a monochromatic light source, instead of using a laser for the light source, a white light source can be combined with an optical filter which transmits only a certain wavelength region.

In the above embodiment, the irradiation of the wafer and the reflection therefrom both consist of parallel light, so in this case autofocusing is basically unnecessary.

The computational processing will now be described when the measurement object is irradiated by white light, focusing on frequency and phase when the film thickness is calculated by performing a frequency analysis on the spectral distribution of the reflected light. The simple model of a pattern 21 in a film 23, shown in FIG. 3, will be considered. Herein, the outermost surface film thickness is denoted by d1. If this film is irradiated perpendicularly by white light, there are reflections from the surface of the film 23, the upper surface of the pattern 21 and a film substrate 22, and these reflections interfere in a complex way. Considering separately those parts where the pattern is present and parts where it is not present as shown in FIG. 3, these parts each have an identical construction to that of a simple single-layer film. If the reflectance from the surface of the film 23, upper surface of the pattern 21 and film substrate 22 are respectively r3, r2 and r1, an intensity reflectance R in the whole film may be expressed by Equation 1 from Fresnel's equation. n is the refractive index of the material of the film 23, and $\lambda$ is the wavelength of the light. Modifying Equation 1, and making approximations such as ignoring high order terms, the intensity reflectance R may be expressed by Equation 2. Herein, if r3, r2 and r1 are assumed to be constant regardless of wavelength, and $1/\lambda[1/nm]$ is taken as the horizontal axis, the spectral intensity distribution of the interference light generated by this film may be expressed as the sum of three sine waves corresponding to the film thicknesses d1, d2 and d3, and a constant.

If the angular frequencies of these sine waves are $\omega i$ (i=1, 2, 3), Equation 2 becomes Equation 3. Therefore, the relation between these angular frequencies $\omega i$ (i=1, 2 and 3) and the film thickness d1 may be expressed by Equation 4. In this way, by performing a frequency analysis on the spectral reflectance distribution waveform and calculating frequency components with certain waveforms, the film thickness of each part may be computed (Equation 5).

$$|R|^2 = |R_A + R_B|^2 = \left| \frac{r_3 + r_1 e^{-2\pi i 2 d_3 \frac{n}{\lambda}}}{1 + r_1 r_3 e^{-2\pi i 2 d_3 \frac{n}{\lambda}}} + \frac{r_3 + r_2 e^{-2\pi i 2 d_1 \frac{n}{\lambda}}}{1 + r_2 r_3 e^{-2\pi i 2 d_1 \frac{n}{\lambda}}} \right|^2 \quad \text{(Equation 1)}$$

where n: refractive index of film material, $\lambda$: wavelength (um)

$$|R|^2 = A + B\cos\left(2\pi \cdot 2 d_1 \cdot \frac{n}{\lambda}\right) + \quad \text{(Equation 2)}$$

$$Ccos\left(2\pi \cdot 2d_2 \cdot \frac{n}{\lambda}\right) + Dcos\left(2\pi \cdot 2d_3 \cdot \frac{n}{\lambda}\right)$$

where A, B, C and D are values represented by $r_3$, $r_2$ and $r_1$ $$|R|^2 = A + Bcos\left(\omega_1 \cdot \frac{n}{\lambda}\right) + Ccos\left(\omega_2 \cdot \frac{n}{\lambda}\right) + Dcos\left(\omega_3 \cdot \frac{n}{\lambda}\right) \quad \text{(Equation 3)}$$

$$\omega_i = 2\pi \cdot 2d_i \cdot n$$

$$d_i = \frac{\omega_i}{4\pi \cdot n} \quad \text{(Equation 5)}$$

Figure 4:
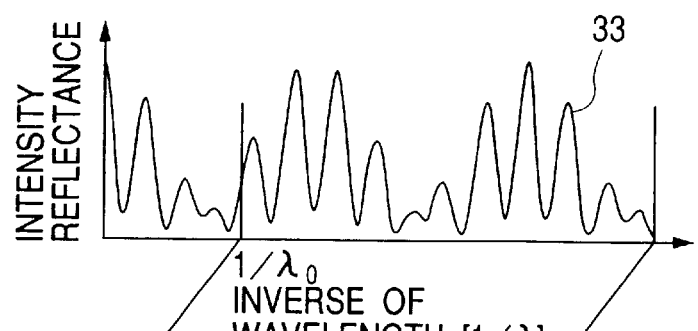
FIG. 4(a) shows an example of a theoretical spectral reflectance distribution.
FIG. 4(b) shows an example of a theoretical spectral reflectance distribution when the detected wavelength region is limited.
Figure 4:
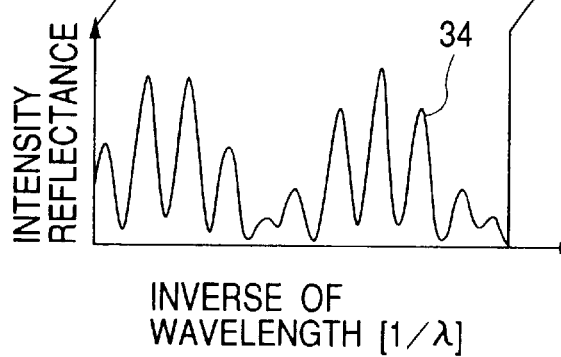

Next, a method will be described for computing the film thickness from the frequency and the phase. FIG. 4(a) shows a theoretical spectral reflectance distribution 33 of interference light when d1=400 nm, d2=1800 nm and d3=2200 nm in the film structure shown in FIG. 3, taking the inverse of wavelength as the horizontal axis. However, as the wavelength region which can be detected in practice by the detector is limited, the spectral reflectance distribution R (34 in FIG. 4(b)) which can be calculated is that represented by Equation 6 (FIG. 4(b)). Herein, $\lambda 0$ is the maximum value of the wavelength region which can be detected. Identically to the computation of frequency, if the phases of the sine waves are $\phi i$, Equation 6 may be expressed by Equation 7. FIG. 8 shows the relation between the phase $\phi i$ and the film thickness di. The phase varies in direct proportion to the film thickness. Hence, the film thickness can be computed also by performing a frequency analysis and finding the phase (Equation 9).

$$|R|^2 = A + Bcos\left\{2\pi \cdot 2d_1 \cdot n \cdot \left(\frac{1}{\lambda} - \frac{1}{\lambda_0}\right)\right\} + \quad \text{(Equation 6)}$$
$$Ccos\left\{2\pi \cdot 2d_2 \cdot n \cdot \left(\frac{1}{\lambda} - \frac{1}{\lambda_0}\right)\right\} +$$
$$Dcos\left\{2\pi \cdot 2d_3 \cdot n \cdot \left(\frac{1}{\lambda} - \frac{1}{\lambda_0}\right)\right\}$$

$$|R|^2 = A + Bcos\left(\omega_1 \cdot \frac{1}{\lambda} - \phi_1\right) + \quad \text{(Equation 7)}$$
$$Ccos\left(\omega_2 \cdot \frac{1}{\lambda} - \phi_2\right) + Dcos\left(\omega_2 \cdot \frac{1}{\lambda} - \phi_3\right)$$

$$\phi_i = 2\pi \cdot 2d_i \cdot n \cdot \frac{1}{\lambda_0} \quad \text{(Equation 8)}$$

$$d_i = \frac{\phi_i \cdot \lambda_0}{4\pi \cdot n} \quad \text{(Equation 9)}$$

As a frequency analysis technique, in the case of FFT, a phase torr i found by analysis is calculated as a value between $-\pi$ and $\pi$. Equation 9 can therefore be written as Equation 10. This phase torr i is obtained by subtracting 2m $\pi$ from a variation amount $\phi i$ of the overall phase. If the analysis is performed by FFT, it can be considered that frequency and phase are calculated by approximately the same number of divisions. As a result, the variation amount relative to film thickness is greater for phase than for frequency, so comparatively higher precision appears to be obtained.

$$d_i = \frac{(\tau_i \cdot 2m\pi) \cdot \lambda_0}{4\pi \cdot n} \quad \text{(Equation 10)}$$

where, m=1, 2, 3, . . .

$$\tau_i = \frac{4\pi \cdot nd_i}{\lambda_0} - 2m\pi \quad \text{(Equation 11)}$$

A frequency analysis is performed on data for which a correction is made up to the axial transformation of FIG. 6, and the frequencies containing the spectral reflectance distribution waveform and its phase are calculated. The frequency analysis technique may be FFT, MEM or another frequency analysis technique.

When the film thickness is measured, it may occur that the film thickness detection region surface is not perpendicular to the optic axis due to inclination of the measuring stage or distortion of the wafer, etc. A fitting can therefore be applied to the stage inclination using the position measurement data of the zero order light (36 in FIG. 1) of the diffraction light so that the film thickness detecting region surface is maintained perpendicular to the optic axis. Further, if the zero order light position is constant, the polishing amount can be known from the film thickness difference. Alternatively, the zero order light position may be fed back to the measurement.

If the wafer is curved, the spectral distribution is condensed in the depressions and the opposite occurs in the projections. This is detected by the absolute position sensor (38 in FIG. 1) from the distance between primary light, not shown, and zero order light (36 in FIG. 1), by the image focus or by the spectral distribution focus, and can be corrected. Also, the curvature of the wafer may also be measured from the above relation between zero order light and high order light.

For example, the film thickness of the outermost surface layer can be found by extracting the frequency component of the highest intensity in a previously specified range. Further, taking FIG. 3 as an example, d2 does not vary before and after processing. Of the spectral positions which do vary before and after processing, the position for which the angular frequency is smallest represents the film thickness of the outermost surface layer. Therefore, even if there are plural pattern layers underneath the film being measured, the spectral position having the smallest angular frequency among the spectral positions which have a variation can be considered to represent the film thickness of the outermost layer.

In this embodiment, the case is shown where FFT and MEM are used for frequency analysis. If the film thickness is computed using the angular frequency, the angular frequency is found which represents the maximum value of an angular frequency spectral intensity distribution 51 by FFT or an angular frequency spectrum intensity distribution 52 by MEM, and the film thickness is then computed by substituting this angular frequency into Equation 3 (FIG. 6(a)).

An example of film thickness computation using phase will now be described when FFT is used for frequency analysis, referring to FIG. 6(b). Equation 10 is replaced by Equation 12. 51 represents the angular frequency distribution and 53 represents the phase distribution in FIG. 6. In the case of computation using phase, m in Equation 13 must be determined.

One-way of determining m is to first find an angular frequency 54 representing the maximum value of the angular frequency spectral intensity, as in the case of frequency. At the same time, a phase 55 of this angular frequency is found. The film thickness is first computed from the calculated angular frequency. The integer m is determined so that the film thickness calculated from Equation 3 satisfies Equation 13.

From m, df i is calculated from Equation 12, and dtorr i is calculated from the phase of the angular frequency representing the maximum value. The film thickness d i is then calculated by taking the sum of df i and dtorr i.

$$d_i = \frac{(\tau_i \cdot 2m\pi) \cdot \lambda_0}{4\pi \cdot n} = \frac{\tau_i \cdot \lambda_0}{4\pi \cdot n} + \frac{m\lambda_0}{2n} = d_{\tau i} + d_{fi} \quad \text{(Equation 12)}$$

$$d_{\tau i} = \frac{\tau_m \cdot \lambda_0}{4\pi \cdot n}, d_{fi} = \frac{m\lambda_0}{2n}$$

$$\frac{(m-1/2) \cdot \lambda_0}{2n} < d_{fi} < \frac{(m+1/2) \cdot \lambda_0}{2n} \quad \text{(Equation 13)}$$

When the film thickness is computed using the phase, a frequency analysis technique other than FFT may also be used for the frequency analysis.

When FFT is used for the frequency analysis, the frequency resolution of the analytical results is determined by the length of the analysis data. As the frequency and film thickness are in a directly proportional relationship, to obtain the required resolution from the computational results, the frequency resolution must be increased. For this purpose, to obtain a sufficient number of data so that the resolution of the analytical results is the required resolution, the frequency analysis is performed after adding 0 value data to the computed spectral reflectance distribution data where the horizontal axis is the inverse of wavelength. Thereby, any desired frequency resolution can be obtained. Alternatively, a complementing technique such as spline or the like may be applied to the frequency analysis results.

When FFT is used for the frequency analysis, the angular frequency spectrum of the analysis results has a unique distribution determined by a window function during frequency analysis. Therefore, if the positions of two spectra are close to each other, the spectral distributions overlap and their peaks are offset from the real peak position. To resolve this problem, a precise maximum value can be found by calculating spectral positions using a waveform separating process such as the Simplex method on the angular frequency spectra obtained. Even if the spectral positions are close when MEM (Maximum Entropy Method) is used for the frequency analysis, a frequency analysis technique where there are little or no spectral overlaps may be used.

In MEM, the analytical results are different depending on the analytical model order set during the analysis, and optimization is required. By optimizing the analysis range of the waveform being measured, an analysis can be performed with no scatter or error due to the order of the analytical model.

Optimization may be performed by varying the analysis range and using plural orders, and selecting the analysis range so that the desired spectral position is constant regardless of the analytical order.

If the effect of the reflected light from lower layers is large such as when the film being measured is a film having a multilayer structure, a correction may be applied by removing the overall waveform trend prior to frequency analysis, or by performing processing such as adding or multiplying by a coefficient distribution which eliminates the effect, on the measured spectral distribution.

The film thickness measurement precision obtained by the above embodiment using phase is at least ±20 nm, and usually ±10 nm (pattern surface area factor (proportion of pattern surface area in measurement visual field relative to surface area of measurement visual field): approximately 20%, interconnection width: 0.35 $\mu$m), so the precision can be improved compared to the method where frequency alone is used (measurement precision: ±50 nm).

In a prior art optical measurement technique, a uniform structure in the measurement visual field having a size of for example at least 1 $\mu$m was necessary. According to this embodiment, the film thickness can still be measured on a step pattern when there is a step pattern such as a device pattern in the measurement visual field. In this case, the measurement precision is affected by reflected light from layers underneath the pattern being measured, and it therefore depends on the proportion of the pattern surface area in the measurement visual field relative to the surface area of the measurement visual field (pattern surface area factor), and on the pattern contour. For example, if the film thickness is being measured on a line and space pattern of submicron pitch smaller than 0.5 $\mu$m, light is diffracted by the pattern, so the reflected light from the lower layers has comparatively less intensity than in the case of a single pattern of identical surface area factor. As a result, a fine pattern is more convenient for measurement.

FIG. 7 shows the results for the film thickness (d1) of the outermost surface calculated from frequency and from phase on a sample having an identical structure to that of FIG. 3. From FIG. 7, it is seen that measurements can be made to a higher precision by computing from the phase than by computing from the frequency. As noise is present in the computation of film thickness from actual data, there is a large error when the frequency analysis is performed using computation by frequency. In computation by phase, the resolution is higher than when frequency is used, i.e., the variation amount is larger relative to the variation amount of film thickness, so a highly precise computation can be performed with relatively low error.

The above description refers to the case of the relatively simple structure shown in FIG. 3, but the film thickness of the outermost surface can also be measured by an identical technique even in the case of a multilayer pattern.

In this case, the term "multilayer" refers to the case where the interconnection itself is multilayer, or to the case where the insulating film between interconnections has a multilayer structure.

When the film is multilayer, the characteristics of the various materials involved may be similar, the film may be much thinner than the wavelength region which can be detected, or the actual film thickness and the computed value may not be in a linear first order relationship in the aforesaid technique using frequency analysis. In this case, to reduce computational error, a suitable curve may be estimated for the relation between the real film thickness and the computed value, and the computed value thereby corrected (FIG. 13).

One way of generating this correction curve, if the structure and materials are known, is to compute the spectral distribution waveform, and then compute the film thickness from the waveform by this technique. Alternatively, actual data can be measured using another reliable film thickness measuring apparatus, and these measurements results then compared with the measurement results obtained by this technique.

The principle of the technique of calculating film thickness, wherein the film being measured is irradiated by white light, and the spectral distribution of the reflected light is fitted to the theoretical spectral distribution, will now be described. If the film structure of the film being measured and the materials of the respective layers are known, the spectral reflectance distribution when a film having this structure is irradiated by white light can be computed. This theoretical spectral reflectance distribution waveform is compared with an actual, measured spectral reflectance distribution using film thickness as a parameter, and by selecting (fitting) the parameter which minimizes the error between these two, the film thickness can be computed.

This technique was also applied in the prior art to devices where the structure of the film being measured was uniform in the measurement visual field. However, even in a case where the structure is not uniform in the measurement visual field, for example as shown in FIG. 3, if the effect of this structure and diffraction due to the structure are taken into account in the theoretical calculation, the film thickness can be computed by an identical fitting to the case where the structure is uniform.

The structure being measured can be obtained from design information.

According to the above fitting technique, with a relatively simple structure (when there is one step in the measurement visual field), a measurement precision of the order of ±5 nm is obtained.

When the structure being measured is complex, fitting may be performed by extracting or attenuating waveforms for specific frequencies by applying suitable filtering such as moving average processing to the actual reflectance distribution waveform (horizontal axis is inverse of wavelength).

Next, embodiments will be described where the aforesaid film thickness detecting system is applied to a processing apparatus or to lines. FIG. 5(a) shows a first embodiment relating to application method. A film thickness detecting optical system 3 is disposed on a polishing board 2, a measurement window, not shown, is provided in the surface of the polishing board 2, and measurement of film thickness is performed from this window. In the first embodiment relating to application method, measurements can be made in-situ without interrupting processing.

The method of using the measured film thickness information in this first embodiment relating to application method is as follows. From the measured film thickness, a polishing rate is computed, and this is then fed back to the polishing time of the wafer being processed. When the film thickness is measured in the first embodiment relating to application method, the time required for loading, unloading, washing and drying of wafer when the film thickness is measured by a ready-made film thickness gauge can be reduced, and throughput increased.

As the measurement is performed in-situ, the polishing rate can also be computed from the film thickness information obtained, and fed back to the polishing time of the wafer currently being polished.

Further, from the film thickness information thus obtained, it may also be determined whether the desired film thickness has been achieved, whether the film thickness lies within a preset film thickness range, and whether processing is complete.

A second embodiment relating to application method is shown in FIG. 5(b). In this second embodiment, a film thickness measurement is performed by temporarily interrupting the CMP process, separating a wafer support tool 1 from the polishing board 2, and inserting a film thickness detecting head 4 between the polishing board 2 and wafer support tool 1, or moving the wafer support tool away from the polishing board to the detecting optical system disposed in the vicinity of the polishing board. In the second embodiment relating to application method, measurement can be performed in-line by temporarily interrupting processing.

The method of using the measured film thickness information in the second embodiment relating to application method is as follows. From the measured film thickness, the polishing rate is computed and this is fed back to the polishing time of the wafer to be processed next. When the film thickness is measured by the second embodiment relating to application method, the time required for loading, unloading, washing and drying the wafer when the film thickness is measured by a ready-made film thickness gauge can be reduced, and throughput increased.

As the measurement is performed by interrupting processing, the polishing rate can also be computed from the film thickness information obtained, and fed back to the polishing time of the wafer currently being polished. Further, from the film thickness information thus obtained, it may also be determined whether the desired film thickness has been achieved, whether the film thickness lies within a preset film thickness range, and whether processing is complete.

A third embodiment relating to application method is shown in FIG. 5(c). In the third embodiment, after polishing is complete, the wafer is set inside a stocker, not shown, for temporary storage, or on a measurement stage, not shown, in a water tank 7 installed midway in a wafer path to transportation by the stocker, and measurement then performed. In the third embodiment relating to application method, in-line measurement can be performed.

In the third embodiment relating to application method, to measure the film thickness in water in the water tank 7, a detector 5 can also be immersed in the water to perform measurements on a wafer 6 held with its surface facing upwards in the water in the water tank 7 (FIG. 8(a)).

Alternatively, the detector 5 can perform measurements via an optical window 8 on the wafer 6 held with the surface facing upwards in the water in the water tank 7 (FIG. 8(b)).

The method of using the measured film thickness information according to the third embodiment relating to application method is as follows.

From the measured film thickness, the polishing rate is computed, and fed back to the polishing time of the wafer to be processed next. When the film thickness is measured by the third embodiment relating to application method, the time required for washing and drying the wafer when the film thickness is measured by a ready-made film thickness gauge can be reduced, and throughput increased.

Further, from the film thickness information thus obtained, it may be determined whether the desired film thickness has been achieved, or whether the film thickness lies within a preset film thickness range. It may also be determined that when the film thickness has not reached a preset thickness or range, the wafer must be reprocessed.

In the first to third embodiments relating to application method, the film thickness distribution can be obtained by varying the relative position of the detector and wafer, and making measurements at plural points on the wafer surface. For example, in the first embodiment relating to application method, this can also be done by adjusting the relative position of the polishing board and wafer support tool. In the case of the second embodiment relating to application method, it may also be done by displacing the detecting optical system or wafer support tool so that the relative positions of the detecting optical system and the wafer support tool which are inserted, can be arbitrarily varied.

The film thickness distribution may also be found by, for example, simultaneously acquiring spectral distributions at plural points on a straight line using a two-dimensional sensor. A two-dimensional film thickness distribution can also been calculated by varying the positional relationship of the detector and wafer.

The film thickness distribution can be calculated at high speed by using plural detectors in parallel and making simultaneous measurements.

When for example the maximum value and minimum value of film thickness in the film thickness distribution are calculated, high precision can be obtained in the measurement range and position by first calculating the film thickness distribution with a large interval and then performing measurements in the vicinity of the maximum value and minimum value with a small interval, or by using the slope of the distribution, pattern information, or film thickness information for another wafer. The above operations may also be automated.

The fineness of the undulation can also be predicted from the pattern surface factor of the lower layers, and the interval of the aforesaid distribution measurements can be automatically determined from the predicted magnitude by a sampling theorem.

Based on the film thickness distribution information obtained, for example the magnitude and period of the undulation of the film thickness distribution, and the maximum and minimum values in the film thickness distribution, CMP process conditions (pad material and surface contour, slurry concentration, materials and supply amounts, chuck pressure and polishing board rotation speed, etc.) can be modified, such as for example by changing the material of the pad to a hard material when there is a large difference between the maximum value and minimum value, and CMP process optimization can be performed automatically such as by reducing defects due to dishing or reducing unevenness of film thickness.

Optimization of processes in the former and latter steps can also be performed automatically based on the measured film thickness information. For example, in the film-forming step which is an early step, the film-forming thickness may be known by measuring the film thickness before the CMP process, and optimization and stabilization of film-forming conditions such as the film-forming time may be performed automatically by comparing with film-forming specifications. Also in the latter steps, etching conditions for example may be automatically determined and processing performed with higher precision from the film thickness on an actual device pattern (FIG. 9).

When the wafer support tool can pressurize a wafer being processed by generating an arbitrary pressure distribution, the optimum pressure distribution can be set automatically from the aforesaid film thickness distribution, and a process surface having a uniform film thickness in the surface can thus be obtained.

This measurement technique allows measurement at any position in a chip without the structure needing to be uniform in the measurement visual field as in the prior art provided that it has a suitable pattern surface factor and contour. This permits the film thickness in the chip to be measured for example in a mesh of an arbitrary interval (FIG. 9), and also permits a uniform, i.e. standard, film thickness control which does not require a circuit.

The detector is aligned with the wafer, for which purpose alignment is performed if required. As the points which can be measured are limited by the arrangement and contour of the pattern depending on the device being measured, it is necessary to carry out positioning to the points which can be measured.

For example, when the size of the visual field is of the order of $\phi 10$ $\mu$m, a positioning precision of ±1 $\mu$m may be necessary in some cases. By carrying out alignment or teaching for each chip or pattern being measured, a precise positioning is possible (FIG. 15).

One method of positioning to the measurement points is to first determine the points which can be measured from design information for the device such as the pattern arrangement or surface area factor, and then perform a determination from image information around measurement points actually acquired by a computer and the design information. Another method is to perform the determination automatically by computing the above processing (FIG. 16).

Due to the positioning precision or other factors, it may occur that positioning to desired measurement points is impossible. In this case, it is necessary to determine whether positioned points are desired measurement points. This could be determined from the pattern contour or surface area factor obtained from image information around the measurement points, the pattern contour or surface area factor obtained from design information for the device, or from a combination of both. This processing can also be computed automatically.

Further, even if positioning to the desired measurement points has been performed, it may for example occur that the measurement of film thickness is difficult in practice, such as when for example the pattern surface area factor in the measurement visual field of the measurement points is less than required (FIG. 14). It is necessary to determine whether the film thickness can be measured for the measurement points. This determination may for example be performed from the characteristics of the measured spectral distribution waveform. A method of determining whether measurement is possible from the waveform characteristics might be to detect the positions of specific peaks in the waveform, or to perform a frequency analysis such as FFT, and determine the position or size of a certain frequency component in a certain range.

Another determining method would be to compute the pattern surface area factor in the measurement visual field from the image around the measurement points, for example, and compare this value with a preset threshold.

The above determination could also be performed automatically.

The determination of whether measurement is possible may be performed for each measurement point, or may be performed after a series of plural measurements is complete. In the latter case, measurement results for points other than those being measured may be used in addition to the above determining method to permit a more reliable determination.

If, as a result of the determination of whether or not film thickness measurement can be performed, it is determined that film thickness measurement is impossible, optimum measurement points could be automatically selected by performing measurements of the spectral distribution for example at several points around the points which were initially positioned, and then determining whether film thickness measurement is possible.

Alternatively, the pattern surface area factor could be computed from the image around measurement points, and the points at which measurement is possible selected automatically.

Further, the above two methods could be combined.

One way of using measurement results from points other than the points being measured might be to perform the determination by, for example, comparing the difference between computed measurement results and computed results for other points with a preset threshold.

The image around the measurement points may also be stored if necessary.

As there is no need to form a pattern to make film thickness measurements, a device with a large effective surface area can be manufactured.

The size of the measurement visual field is limited by the light amount which can be detected. If the required light amount can be provided, measurements can be made in a measurement visual field of desired size and shape.

The size and shape of the measurement visual field when the film thickness is measured may be varied.

In addition to this embodiment, FIG. 10 for example shows a method of changing over the field wherein an objective lens is used for the optical system, and the size of the visual field is varied by changing over the objective lens.

The film thickness distribution measurement results are different depending on the size of the visual field when measurements are made. If the measurement visual field is made smaller, the film thickness distribution can be found with a smaller interval. However, if the size of the measurement visual field is near to the pattern interval as shown in FIG. 10(b), the film thickness on the pattern can no longer be evaluated alone. Hence, the measurement visual field is optimized according to the purpose of measurement and the object being measured. This optimization may easily be performed automatically from the measurement results or from pattern information for a device which was previously acquired.

When the measurement visual field is small, a high precision measurement can be performed, but film thickness increases in regions where there is no pattern. If an operation is performed to extract the film thickness for the outermost surface (or a desired film thickness), e.g., an operation which extracts only a value near to an existing film thickness value or extracts a film thickness value of the highest frequency, the information is easier to utilize. Conversely, with a wide field, the size of a chip of average film thickness can for example be extracted, and the film thickness on the wafer can be controlled without being influenced by chip position information. An intermediate visual field or combination is of course also possible.

If the measurement visual field does not exceed the pattern width, the contour of the pattern can be verified by measuring the film thickness. By comparing the obtained measurement results with previously acquired pattern information, imperfections of pattern shape or foreign bodies may be detected (FIG. 10(c)).

As the depth of foreign bodies or shape imperfections from the surface is known, it may be specified to what extent these objects or imperfections are present.

If the spectral distribution of the reflected light is analyzed or a separate means is provided to measure surface imperfections, the film thickness and imperfections may be simultaneously measured (FIG. 11). The imperfection measuring means may for example employ a surface imperfection measuring means such as is described in Japanese Unexamined Patent Publication 7-74088.

A display means is provided which can simultaneously display the measured film thickness and film thickness distribution, the coordinates on the wafer, the processing conditions at that time and the computed polishing rate, so the operator of the apparatus can perform continuous monitoring.

The display means can simultaneously display the measured film thickness distribution and imperfections and previously acquired device pattern information side by side, superimposed or by switching from one to the other (FIG. 11). This information may be simultaneously displayed either three-dimensionally from the upper layer, or as a cutaway of a certain section. The device pattern information indicates the contour of the pattern or local pattern surface factors, etc.

If the above are superimposed in the display, the relations between three values may be viewed by computing the three values if necessary. The results of relational computations may also be fed back to the determination of process conditions. For example, if the correlation between film thickness distribution and pattern surface area factor is small, and the correlation between film thickness distribution and imperfection distribution is large, optimization such as changing the pad to a hard material and performing processing which does not depend on the pattern, may be automatically performed.

By determining the difference between the film thickness distribution and imperfection distribution, imperfections in lower layer films can be computed. In this event, the two values are corrected if necessary.

The display means may also display a theoretical spectral reflectance distribution computed from a spectral reflectance distribution wherein the horizontal axis, which is the inverse of wavelength, is computed from measurement data, or the measured film thickness. Both of these may also be displayed simultaneously, and the relation between the two may be observed by comparing them using the method of least squares, for example. The operator can also simultaneously display and compare the theoretical spectral distribution of an arbitrarily set film thickness, and the spectral distribution computed from measurement data.

The measured film thickness or distribution data may also be supplied to yield or quality control systems and used for defect analysis.

The above embodiment was described in the context of film thickness of a wafer surface on which a pattern was formed after CMP processing. However, an identical film thickness measurement may be performed in other steps where the object being measured has an identical structure, in films other than those on semiconductor devices, or in optically transparent films having a multilayer construction.

When the object being measured has a multilayer structure, the thickness of any desired layer can be measured by measuring the film thickness before and after processing. For example, not only the surface film thickness, but also the pattern thickness or film thickness between lower layers may also be found (FIG. 12).

By measuring the film thickness between layers, the electrical capacity between interconnections can be evaluated and the performance of the device can be predicted.

By measuring the film thickness of an arbitrary layer and controlling the film thickness to high precision, the performance of the device can be controlled to high precision.

When the film being measured has a multilayer structure, reflected light from the lower layers causes errors.

The effect of reflected light from lower layers can be reduced by using light of a wavelength region which is largely absorbed by the film, thereby permitting a high precision measurement to be made.

When the aforesaid measurement method is applied to the CMP of metals, the end point of a process can be detected from the waveform of the spectral distribution of reflected light from the wafer.

By performing measurement before and after processing, a change due to processing in the material being processed, for example the refractive index, can be detected. Also, a change of transition density in the material can be predicted from this change.

From the intensity of the reflected light detected by the detector, the local pattern surface factor or the state of surface roughness of the object being measured can be found.

This technique requires measurement of the spectral distribution waveform in order to measure film thickness. This may be measured by a film thickness measurement apparatus of the prior art, and the film thickness computed by processing the signal obtained. In other words, it is sufficient to measure the spectral distribution waveform.

For example, a film thickness measuring apparatus of the prior art may be connected to a film thickness computing signal processing computer by a communication means such as a LAN, spectral distribution data measured by the prior art apparatus can be automatically acquired by the computer, and the film thickness thus computed.

In inter-layer insulating film steps, the sensitivity of a foreign body tester or appearance tester varies with film thickness. Hence, by attaching a film thickness measuring apparatus to these testers, the conditions for measurement sensitivity can be automatically determined, sensitivity correction can be performed, and high precision testing can be carried out. For example, the sensitivity can be decreased by changing the position of the detector according to the measured film thickness.

According to this invention, the film thickness of a transparent film can measured to high precision, and high precision film thickness control can be performed based on the measured film thickness data. Further, by incorporating this film thickness measuring unit in a processing apparatus, processing throughput can be increased. For example, the outermost surface film thickness can measured to high precision, high precision film thickness control performed and processing throughput increased in wafers subjected to surface smoothing treatment after film-forming in the above method of manufacturing a semiconductor device on a silicon wafer, or in a production line.

Industrial Field of Application

As described above, according to this invention, in a method of manufacturing a semiconductor device or in a production line, high precision measurement of the thickness and thickness distribution of a transparent film can be performed, high precision film thickness control performed based on the measured film thickness data, and process throughput increased in wafers subjected to surface smoothing treatment after film-forming.

In addition to the aforesaid semiconductor wafers, this invention may also be applied to measurement of film thickness in optically transparent resist films or insulating films in steps for manufacturing thin film devices such as digital video discs (DVD), liquid crystal display elements using thin film transistors (TFT), or large-scale integrated circuits (LSI).

What is claimed is:

1. A film thickness measuring method for thin films, characterized in that a sample, wherein an optically transparent thin film is formed on a step pattern, is irradiated by light, the reflected light generated by said sample due to said light irradiation is detected, and the film thickness of the optically transparent thin film formed on said step pattern is calculated based on a frequency and a phase of a spectral distribution waveform of the detected reflected light.

2. A film thickness measuring method for thin films, characterized in that a sample, wherein an optically transparent thin film is formed on a step pattern, is irradiated by light, the reflected light generated by said sample due to said light irradiation is detected, and the film thickness of the optically transparent thin film formed on said step pattern is found by fitting a spectral distribution waveform derived from a structural model of the optically transparent thin film and said step pattern to a spectral distribution waveform of the detected reflected light.

3. A film thickness measuring method as claimed in claim 2, wherein the light which irradiates said sample is white light.

4. A film thickness measuring method for thin films, characterized in that a sample, wherein an optically transparent thin film is formed on a step pattern, is irradiated by white light, the reflected light generated by said sample due to said white light irradiation is detected, and the film thickness of the optically transparent thin film formed on said step pattern is calculated to a precision of at least ±20 nm by using information of the spectral distribution waveform of the detected reflected light.

5. An apparatus for measuring a film thickness of optically transparent thin films in a sample wherein an optically transparent thin film is formed on a step pattern, said apparatus comprising:
   irradiating means for irradiating said sample by light;
   detecting means for detecting reflected light generated by said sample irradiated by said irradiating means; and
   computing means for computing the film thickness of the optically transparent thin film formed on said step pattern based on a frequency and a phase of a spectral distribution waveform of the reflected light detected by said detecting means.

6. An apparatus for measuring a film thickness of optically transparent thin films in a sample wherein an optically transparent thin film is formed on a step pattern, said apparatus comprising:
   irradiating means for irradiating said sample by light;
   detecting means for detecting reflected light generated by said sample irradiated by said irradiating means; and
   computing means for computing the film thickness of the optically transparent film formed on said step pattern by fitting a spectral distribution waveform derived from a structural model of the optically transparent thin film and said step pattern to a spectral distribution waveform of the detected reflected light.

7. An apparatus as claimed in claim 5 or 6, wherein said irradiating means irradiates said sample with white light.

8. An apparatus for measuring a film thickness of optically transparent thin films in a sample wherein an optically transparent thin film is formed on a step pattern, said apparatus comprising:
   irradiating means for irradiating said sample by white light;
   detecting means for detecting reflected light generated by said sample irradiated by said irradiating means; and
   computing means for computing the film thickness of the optically transparent thin film formed on said step pattern by using information of spectral distribution waveform of the reflected light detected by said detecting means to a precision of at least ±20 nm.

9. A method of manufacturing a thin film device, characterized in that, in a step for polishing an optically transparent thin film formed on a step pattern of the thin film device, said optically transparent thin film is irradiated by light, the reflected light generated by said sample due to said light irradiation is detected, the film thickness of the optically transparent film thin formed on said step pattern is calculated based on a frequency and a phase of a spectral distribution waveform of the detected reflected light, and polishing is performed based on said calculated result.

10. A method of manufacturing a thin film device, characterized in that, in a step for polishing an optically transparent thin film formed on a step pattern of the thin film device, said optically transparent thin film is irradiated by light, the reflected light generated by said sample due to said light irradiation is detected, the film thickness of the optically transparent thin film formed on said step pattern is found by fitting a spectral distribution waveform derived from a structural model of the optically transparent thin film and said step pattern to a spectral distribution waveform of the detected reflected light, and polishing is performed based on said calculated result.

11. A method claimed in claim 9 or 10, wherein said irradiation by light and detection of said reflected light are performed while polishing said optically transparent thin film.

12. A method as claimed in claim 9 or 10, wherein said irradiation by light and detection of said reflected light are performed after polishing said optically transparent thin film.

13. A method as claimed in claim 9 or 10, wherein the light which irradiates said optically transparent thin film is white light.

14. A method of manufacturing a thin film device, characterized in that an optically transparent film, formed on a step pattern of the thin film device during the manufacture of the thin film device, is irradiated by light, the reflected light generated by said sample due to said light irradiation is detected, and the film thickness of the optically transparent film formed on said step pattern is calculated based on a frequency and a phase of a spectral distribution waveform of the detected reflected light.

15. A method of manufacturing a thin film device, characterized in that an optically transparent film, formed on a step pattern of the thin film device during the manufacture of the thin film device, is irradiated by light, the reflected light generated by said sample due to said light irradiation is detected, and the film thickness of the optically transparent film formed on said step pattern is found by fitting a spectral distribution waveform derived from a structural model of the optically transparent film and said step pattern to a spectral distribution waveform of the detected reflected light.

16. A method of manufacturing a thin film device, characterized in that an optically transparent film is irradiated by white light during a step for polishing the optically transparent film formed on a step pattern of the thin film device, the reflected light generated by said sample due to said light irradiation is detected, the film thickness of the optically transparent film formed on said step pattern is calculated by using information of a spectral distribution waveform of the detected reflected light to a precision of at least ±20 nm, and said polishing step is controlled based on the calculated result.

17. An apparatus for manufacturing a thin film device, comprising:
polishing means for polishing an optically transparent film formed on a step pattern of said thin film device;
irradiating means for irradiating said sample by light;
detecting means for detecting reflected light generated by said sample irradiated by said irradiating means; and
film thickness computing means for computing the film thickness of the optically transparent film formed on said step pattern based on a frequency and a phase of a spectral distribution waveform of the reflected light detected by said detecting means.

18. An apparatus for manufacturing a thin film device, comprising:
polishing means for polishing an optically transparent film formed on a step pattern of said thin film device;
irradiating means for irradiating said sample by light, detecting means for detecting reflected light generated by said sample irradiated by said irradiating means; and
film thickness computing means for computing the film thickness of the optically transparent film formed on said step pattern by fitting a wavelength dependent waveform derived from a structural model of the optically transparent film and said step pattern to a wavelength dependent spectral distribution waveform of the detected reflected light.

19. An apparatus for manufacturing a thin film device, comprising:
irradiating means for irradiating an optically transparent film formed on a step pattern of said thin film device by light;
detecting means for detecting reflected light generated by said sample irradiated by said irradiating means; and
computing means for computing the film thickness of the optically transparent film formed on said step pattern based on a freqency and a phase of a spectral distribution waveform of the reflected light detected by said detecting means.

20. An apparatus for manufacturing a thin film device, comprising:
irradiating means for irradiating an optically transparent film formed on a step pattern of said thin film device by light;
detecting means for detecting reflected light generated by said sample irradiated by said irradiating means; and
computing means for computing the film thickness of the optically transparent film formed on said step pattern by fitting a spectral distribution waveform derived from a structural model of the optically transparent film and said step pattern to a wavelength dependent spectral distribution waveform of the detected reflected light.

21. An apparatus as claimed in any of claims 17 to 20, wherein said irradiating means irradiates white light.

22. An apparatus for manufacturing a thin film device, comprising:
polishing means for polishing an optically transparent film formed on a step pattern of said thin film device;
irradiating means for irradiating said sample by white light;
detecting means for detecting reflected light generated by said sample irradiated by said irradiating means; and
film thickness computing means for computing the film thickness of the optically transparent film formed on said step pattern by using information of a phase of a spectral distribution waveform of the reflected light detected by said detecting means to a precision ±20 nm.

* * * * *